US011319423B2

(12) United States Patent
Miller et al.

(10) Patent No.: US 11,319,423 B2
(45) Date of Patent: May 3, 2022

(54) FOAMABLE, INSULATING-LAYER-FORMING MULTI-COMPONENT COMPOSITION HAVING IMPROVED STORAGE STABILITY AND USE OF THE SAME

(71) Applicant: Hilti Aktiengesellschaft, Schaan (LI)

(72) Inventors: Jekaterina Miller, Ostfildern (DE); Mario Paetow, Landsberg am Lech (DE)

(73) Assignee: Hilti Aktiengesellschaft, Schaan (LI)

( * ) Notice: Subject to any disclaimer, the term of this patent is extended or adjusted under 35 U.S.C. 154(b) by 278 days.

(21) Appl. No.: 16/463,240

(22) PCT Filed: Nov. 14, 2017

(86) PCT No.: PCT/EP2017/079156
§ 371 (c)(1),
(2) Date: May 22, 2019

(87) PCT Pub. No.: WO2018/099721
PCT Pub. Date: Jun. 7, 2018

(65) Prior Publication Data
US 2019/0322829 A1 Oct. 24, 2019

(30) Foreign Application Priority Data
Nov. 29, 2016 (EP) ..................... 16201080

(51) Int. Cl.
| *C08J 9/08* | (2006.01) |
| *C08J 9/00* | (2006.01) |
| *C08G 18/10* | (2006.01) |
| *B29C 44/02* | (2006.01) |
| *B29K 75/00* | (2006.01) |
| *B29K 105/00* | (2006.01) |
| *B29K 105/04* | (2006.01) |

(52) U.S. Cl.
CPC ............ *C08J 9/0061* (2013.01); *C08G 18/10* (2013.01); *C08J 9/0038* (2013.01); *C08J 9/08* (2013.01); *B29C 44/02* (2013.01); *B29K 2075/00* (2013.01); *B29K 2105/0026* (2013.01); *B29K 2105/04* (2013.01); *C08J 2201/026* (2013.01); *C08J 2203/02* (2013.01); *C08J 2371/00* (2013.01); *C08J 2375/04* (2013.01)

(58) Field of Classification Search
CPC . C08J 9/0061; C08J 9/0038; C08J 9/08; C08J 2201/026; C08J 2203/02; C08J 2371/00; C08J 2375/04; C08J 2201/022; C08J 2207/04; C08J 2300/108; C08J 9/06; C08J 9/0004; C08J 2207/00; C08G 18/10; B29C 44/02; B29K 2075/00; B29K 2105/0026; B29K 2105/04
See application file for complete search history.

(56) References Cited

U.S. PATENT DOCUMENTS

| 3,562,197 | A | 2/1971 | Sears et al. |
| 3,969,291 | A | 7/1976 | Fukuba et al. |
| 4,442,157 | A | 4/1984 | Marx et al. |
| 7,479,513 | B2 | 1/2009 | Reinheimer et al. |
| 7,550,517 | B2 | 6/2009 | Stanjek et al. |
| 8,450,514 | B2 | 5/2013 | Schubert et al. |
| 8,883,932 | B2 | 11/2014 | Brugger et al. |
| 8,993,706 | B2 | 3/2015 | Schubert et al. |
| 9,440,996 | B2 | 9/2016 | Schönberger |
| 9,441,145 | B2 | 9/2016 | Schubert et al. |
| 9,920,157 | B2 | 3/2018 | Köcher et al. |
| 9,975,909 | B2 | 5/2018 | Schubert et al. |
| 2004/0256605 | A1 | 12/2004 | Reinheimer et al. |
| 2006/0189705 | A1 | 8/2006 | Stanjek et al. |
| 2010/0041910 | A1 | 2/2010 | Schubert et al. |
| 2011/0042004 | A1 | 2/2011 | Schubert et al. |
| 2012/0028022 | A1 | 2/2012 | Brugger et al. |
| 2012/0029090 | A1 | 2/2012 | Brugger et al. |
| 2013/0245304 | A1 | 9/2013 | Schubert et al. |
| 2014/0255373 | A1* | 9/2014 | Schonberger ............ C07F 7/10 424/94.1 |
| 2015/0079296 | A1* | 3/2015 | Pusel .................. C09D 175/04 427/387 |
| 2015/0159068 | A1 | 6/2015 | Schubert et al. |
| 2015/0274918 | A1 | 10/2015 | Köcher et al. |
| 2015/0284499 | A1 | 10/2015 | Köcher et al. |
| 2015/0284611 | A1* | 10/2015 | Thiemann ............... C09D 5/18 524/437 |
| 2018/0118909 | A1 | 5/2018 | Jeromenok et al. |

FOREIGN PATENT DOCUMENTS

| CA | 2950980 A1 * | 12/2015 | ............. C08K 3/22 |
| DE | 103 57 093 | 7/2005 | |
| DE | 10 2008 000 360 | 8/2009 | |
| DE | 10 2009 028 640 | 2/2011 | |
| DE | 10 2010 038 355 | 1/2012 | |
| DE | 10 2010 038 768 | 2/2012 | |
| DE | 10 2010 038 774 | 2/2012 | |

(Continued)

OTHER PUBLICATIONS

International Search Report dated Dec. 13, 2017 in PCT/EP2017/079156 with English translation.
Written Opinion dated Dec. 13, 2017 in PCT/EP2017/079156.

*Primary Examiner* — Kara B Boyle
(74) *Attorney, Agent, or Firm* — Grüneberg and Myers PLLC

(57) ABSTRACT

A foamable, insulating-layer-forming multi-component composition contains alkoxysilane-functional polymer, insulating-layer-forming fire-protection additive, blowing-agent mixture, cross-linking agent, and a flame-protection agent that is miscible in water or another compound that is miscible in water. The individual ingredients of the blowing-agent mixture are separated from one another to ensure inhibition of reaction prior to use of the composition, and the cross-linking agent is separated from the alkoxysilane-functional polymer to ensure inhibition of reaction prior to use of the composition. The foamable, insulating-layer-forming multi-component composition can be used as a foam-in-place foam or for production of molded blocks.

20 Claims, No Drawings

(56) References Cited

FOREIGN PATENT DOCUMENTS

| | | | |
|---|---|---|---|
| EP | 0 139 401 | 2/1985 | |
| EP | 0 138 546 | 4/1985 | |
| EP | 1 489 136 | 12/2004 | |
| EP | 1 829 908 | 9/2007 | |
| EP | 1829908 A1 * | 9/2007 | ............... C08J 9/06 |
| EP | 2725044 | 4/2014 | |
| EP | 3 095 809 | 11/2016 | |
| GB | 755551 | 8/1956 | |
| GB | 2 007 689 | 5/1979 | |
| WO | 00/04069 | 1/2000 | |
| WO | 2013/045422 | 4/2013 | |
| WO | 2013/107744 | 7/2013 | |
| WO | 2014/064039 | 5/2014 | |

* cited by examiner

FOAMABLE, INSULATING-LAYER-FORMING MULTI-COMPONENT COMPOSITION HAVING IMPROVED STORAGE STABILITY AND USE OF THE SAME

This application is a National Stage entry under § 371 of International Application No. PCT/EP2017/079156, filed on Nov. 14, 2017, and which claims the benefit of European Application No. 16201080.5, filed on Nov. 29, 2016.

The present invention relates to a foamable, insulating-layer-forming multi-component composition and use of the same.

Polyurethanes are often used as binders for mounting, insulating and fire-protection foams. These may be applied, for example, as 1-component, 2-component aerosol cans or as 2-component cartridge foam. In the first case the system needs high atmospheric humidity in order to cure. In the latter two cases, curing is achieved via the polyol/water component. The hardener component, i.e. the isocyanate, has long been regarded as a hazardous substance.

One solution proposed for this are the so-called "low-MDI foams", in which isocyanate prepolymers with a content of less than 1% or even 0.1%, for example, are used, such as described, for example, in DE 102010038355 A1 or DE 10357093 A1.

Another proposed solution is based on the use of "modified silanes" (also known as STP, silane-terminated polymer). These polymers, which often have a polyurethane or polyether backbone, cure via hydrolysis and polycondensation reaction of the alkoxysilyl groups. Such foams are commercially available as insulating foams in pressurized cans. The canned foams are generally foamed via a physical blowing agent. Such systems are known, for example, from WO 2000/004069 A1, US 2006/189705 A, WO 2013/107744 A1 or WO 2013/045422 A1.

A disadvantage for fire properties of canned foams that work with physical blowing agents and at the same time function as solvents for the prepolymers is that only low densities can be achieved. In order to generate stable ashes in the fire situation, densities greater than 100 g/L are generally needed, but they can hardly be achieved with conventional canned foams. A further disadvantage is the greatly limited usability, from the can, of fillers, which are necessary for good fire-protection properties, because here the settling behavior, the ease of valve operation and the storage stabilities with the prepolymers are problematic. Another disadvantage is the post-foaming after application of the foam from the can, because the foam reacts further with atmospheric moisture. After the canned foams cure due to atmospheric moisture, curing "in bulk" proceeds only slowly or incompletely, i.e. normal curing on the surface but retarded curing in deeper levels, since moisture is lacking there.

Besides the one-component STP canned foams, two-component or multi-component systems are also known, for example from EP 1829908 A1, EP 2725044 A1 or WO 2014/064039 A1. However, the known STP canned foams and two-component systems are not fire-protection foams and do not contain any fire-protection additives.

In EP 15168558, which is not a prior application, a foamable, insulating-layer-forming multi-component composition is described with at least one alkoxysilane-functional polymer, with at least one insulating-layer-forming fire-protection additive, with a blowing-agent mixture and with a cross-linking agent. The described composition is characterized in that the individual ingredients of the blowing-agent mixture are separated from one another to ensure inhibition of reaction prior to use of the composition, and the cross-linking agent is separated from the alkoxysilane-functional polymer to ensure inhibition of reaction prior to use of the composition. A disadvantage of the composition described in EP 15168558 is that it contains a metal catalyst.

The inventors have now discovered that the presence of a metal catalyst and of amines, especially aminosilanes, negatively influences the storage stability of the composition. Furthermore, some of the metal catalysts, for example tin catalysts, are hazardous to health, which requires that they be labeled and thus leads to poorer customer acceptance.

The object underlying the invention is to provide foams, especially foam-in-place foams and foam-in-place foams that are quite particularly stable during storage, which foams do not exhibit the said disadvantages of the known systems and which are suitable for fire protection.

This object is solved by the composition according to claim 1. Preferred embodiments can be found in the dependent claims.

Subject matter of the invention is accordingly a foamable, insulating-layer-forming multi-component composition with at least one alkoxysilane-functional polymer, which contains, as terminal groups and/or as side groups along the polymer chain, at least two alkoxy-functional silane groups of the general formula (I)

$$—Si(R^1)_m(OR^2)_{3-m} \qquad (I),$$

wherein $R^1$ stands for a linear or branched $C_1$-$C_{16}$ alkyl moiety, $R^2$ for a linear or branched $C_1$-$C_6$ alkyl moiety and m for a whole number from 0 to 2, at least one cross-linking agent, which, prior to use of the composition, is separated from the alkoxysilane-functional polymer to ensure inhibition of reaction, a blowing-agent mixture, the individual ingredients of which, prior to use of the composition, are separated from one another to ensure inhibition of reaction, at least one insulating-layer-forming fire-protection additive and 7 to 30 wt % relative to the total weight of the composition, of at least one compound, selected from the group consisting of liquid flame-protection agents and liquid compounds that are respectively miscible with water, wherein the polymer has a dynamic viscosity in the range of 5 to 27 Pa·s, preferably in the range of 7 to 25 Pa·s and more preferably in the range of 10 to 21 Pa·s and comprises a basic backbone, which is selected from the group consisting of an alkyl chain, a polyether, polyester, polyether ester, polyamide, polyurethane, polyester urethane, polyether urethane, polyether ester urethane, polyamide urethane, polyurea, polyamine, polycarbonate, polyvinyl ester, polyacrylate, polyolefin, polyisobutylene, polysulfide, rubber, neoprene, phenol resin, epoxy resin and melamine.

The composition is characterized in particular in that it is free of catalysts, especially metal catalysts and the like.

Surprisingly, it has been found that better mixing of the just mentioned foamable, insulating-layer-forming multi-component composition and rapid curing of the resulting foam may be achieved even in the absence of a catalyst, especially a metal catalyst, when one or more compounds that dissolve in the curing agent, namely water or an aqueous solution, are added to the composition. These compounds are liquid flame-protection agents and liquid compounds that are respectively miscible with water.

However, when the content of such substances is low, i.e. below 7 wt % relative to the weight of the entire composition, the foam formed by the blowing agent often collapses. In order to achieve rapid curing even without the presence of a catalyst, especially metal catalyst, a certain quantity of the just described water-soluble compounds must be contained in the compositions. The more of such a substance that is present, the better is the mixing. Accordingly, the foam does not collapse and cures faster, and the pores of the formed foam are more homogeneous and smaller. Nevertheless, a too high proportion of the water-soluble flame-protection agent or of the liquid compound is just as detrimental as a too low proportion. Above 23 wt %, the density of the composition increases so much that the foam yield is reduced. At the same time, the composition cures too rapidly, at least initially, which again acts negatively on the foam formation, wherein the foam formation is partly hindered or even prevented, which may then cause the foam to become brittle. This acts negatively on the properties, especially the fire-protection properties, of the cured composition.

A further advantage of the composition lies in its improved storage stability, which is to be attributed to the absence of a catalyst, especially a metal catalyst.

For better understanding of the invention, the following explanations of the terminology used herein are considered to be useful. Within the meaning of the invention:

"flame-protection agent" (frequently also referred to as fire retardant) means a substance capable of limiting, slowing or preventing the spread of fires;

"miscible with water" means the property of a substance to mix with water in a homogeneous distribution;

a "polymer" is a molecule with six or more repeating units, which may have a structure that can be linear, branched, star-shaped, coiled, hyperbranched or cross-linked; polymers may contain a single type of repeating units ("homopolymers") or they may contain more than one type of repeating units ("copolymers"); as used herein, the term "polymer" comprises both prepolymers, which may also include oligomers with 2 to 5 repeating units, such as the alkoxysilane-functional compounds used as ingredient A, which react with one another in the presence of water with formation of Si—O—Si bonds, and also the polymeric compounds formed by the reaction just mentioned;

"chemical intumescence" means the formation of a voluminous insulating ash layer by compounds that are appropriately matched to one another and that react with one another under the effect of heat;

"physical intumescence" means the formation of a voluminous insulating layer by swelling of a compound, which releases gases under the effect of heat, even though no chemical reaction has occurred between two compounds, whereby the volume of the compound increases by a multiple of the original volume;

"insulation-layer-forming" means that, in the fire situation, a solid microporous carbon foam is produced, so that the resulting finely porous and thick foam layer, the so-called ash crust, insulates a substrate against heat, depending on composition;

a "carbon source" is an organic compound which, due to incomplete combustion, leaves behind a carbon skeleton and is burned incompletely to carbon dioxide and water (carbonization); these compounds are also known as "carbon-skeleton-forming substances";

an "acid former" is a compound which, under the effect of heat, i.e. above approximately 150° C., forms a non-volatile acid, for example due to decomposition, and thereby acts as a catalyst for carbonization; in addition, it may contribute to lowering the viscosity of the melt of binder; the term "dehydrogenation catalyst" is used synonymously in this context;

a "gas builder" is a compound that decomposes at elevated temperature with evolution of inert, i.e. non-combustible gases and optionally expands the softened binder into a foam (intumescence);

an "ash-crust stabilizer" is a so-called skeleton-forming compound, which stabilizes the carbon skeleton (ash crust) formed by the interaction of carbon formation from the carbon source and the gas from the gas builder or by physical intumescence.

According to the invention, the alkoxysilane-functional polymer comprises a basic backbone, which is selected from the group consisting of a polyether, polyester, polyether ester, polyamide, polyurethane, polyester urethane, polyether urethane, polyether ester urethane, polyamide urethane, polyurea, polyamine, polycarbonate, polyvinyl ester, polyacrylate, polyolefin, such as polyethylene or polypropylene, polyisobutylene, polysulfide, rubber, neoprene, phenol resin, epoxy resin, melamine. The alkoxysilane-functional polymer may also be a mixture of alkoxysilane-functional polymers that have different basic backbones, among which mixtures with a polyether basic backbone and a polyurethane basic backbone are preferred. Alkoxysilane-functional polymers with a polyurethane basic backbone are particularly preferred. This basic backbone may have linear or branched structure (linear basic backbone with side chains along the chain of the basic backbone), and may contain terminal alkoxy-functional silane groups, i.e. as end groups of a linear basic backbone or as end groups of the linear basic backbone and as end groups of the side groups, preferably at least two alkoxy-functional silane groups.

In order to achieve good foam formation, caused by the blowing-agent mixture, and to ensure that the foam is sufficiently stable until curing of the binding agent, the alkoxysilane-functional polymer has, according to the invention, a dynamic viscosity in the range of 5 to 27 Pa·s, preferably in the range of 7 to 25 Pa·s and more preferably in the range of 10 to 21 Pa·s. If a mixture of several polymers with similar polymer basic backbone or different polymer backbones is used, the viscosity of the mixture lies, according to the invention, in the just mentioned range.

The alkoxy-functional silane group has the general formula (I)

$$—Si(R^1)_m(OR^2)_{3-m} \qquad (I),$$

wherein $R^1$ stands for a linear or branched $C_1$-$C_{16}$ alkyl moiety, preferably for a methyl or ethyl moiety, $R^2$ for a linear or branched $C_1$-$C_6$ alkyl moiety, preferably for a methyl or ethyl moiety, and m for a whole number from 0 to 2, preferably 0 or 1. Most preferably, the at least two alkoxy-functional silane groups are difunctional (m=1) or trifunctional (m=0), and the alkoxy group is a methoxy or ethoxy group.

Preferably the alkoxy-functional silane group is bound to the basic backbone via group, such as a further, different functional group (X=—S—, —OR, —NHR, —NR$_2$, for example), which either is able itself to function as an electron donor or contains an atom that is able to function as an electron donor, wherein the two functional groups, i.e. the further functional group and the alkoxy-functional silane group, are bound to one another via a methylene bridge (—X—CH$_2$—Si(R$^1$)$_m$(OR$^2$)$_{3-m}$). Hereby an electronic interaction (backbonding) is induced between the silicon atom and the electron donor, wherein electron density is shifted from the donor to the silicon atom, leading to weakening of the Si—O bond and in turn resulting in greatly increased reactivity of the Si-alkoxy groups. This is known as the so-called α-effect. Such compounds are also known as α-silanes. Besides this, however, so-called γ-silanes or other kinds of silanes may also be used.

Particularly preferred alkoxysilane-functional polymers are polymers in which the basic backbone is terminated via a urethane group or an ether group containing silane groups, such as, for example dimethoxy(methyl)silylmethyl carbamate-terminated polyethers and polyurethanes, diethoxy(methyl)silylmethyl carbamate-terminated polyethers and polyurethanes, trimethoxysilylmethyl carbamate-terminated polyether and polyurethanes, triethoxysilylmethyl carbamate-terminated polyethers and polyurethanes, or mixtures thereof.

Examples of suitable polymers comprise silane-terminated polyether (e.g. Geniosil® STP-E 10 and Geniosil® STP-E 30 of Wacker Chemie AG; MS polymers of Kaneka Corporation (especially MS-203, MS-303, SAX260, SAX350, SAX400, SAX220, S154, S327, S227, SAX725, SAX510, SAX520, SAX530, SAX580, SAT010, SAX015, SAX770, SAX220, SAX115, (polyether backbone)) and silane-terminated polyurethanes (e.g. Polymer ST61, Polymer ST75 and Polymer ST77 of Evonik Hanse, Desmoseal® S XP 2458, Desmoseal® S XP 2636, Desmoseal@ S XP 2749, Desmoseal® S XP 2821 of Bayer, SPUR+*1050MM, SPUR+*1015LM, SPUR+*3100HM, SPUR+*3200HM of Momentive).

As alternative polymers, such in which the alkoxy-functional silane groups are incorporated not (only) terminally in the basic backbone of the polymer, but are selectively distributed in side positions over the chain of the basic backbone, may be preferably used. Important properties, such as the cross-linking density, can be controlled via the incorporated several cross-linking units. Suitable examples that may be mentioned here are the TEGOPAC® product line of Evonik Goldschmidt GmbH, such as TEGOPAC BOND 150, TEGOPAC BOND 250 and TEGOPAC SEAL 100, as well as GENIOSIL® XB 502, GENIOSIL® WP1 and GENIOSIL® WP2 of Wacker Chemie AG. In this connection, reference is made, for example, to DE 102008000360 A1, DE 102009028640 A1, DE102010038768 A1 and DE 102010038774 A1.

As already mentioned, the alkoxysilane-functional polymer may also be a mixture of two or more alkoxyfunctional polymers with the basic backbones that are described in the foregoing and that may be similar or different.

Depending on chain length of the basic backbone, alkoxy functionality of the polymer and position of the alkoxy-functional silane groups, the degree of cross-linking of the binder and thus both the strength of the resulting coating and its elastic properties can be adjusted.

Usually the proportion of binder amounts to 10 to 70 wt %, preferably 15 to 65 wt %, more preferably 20 to 55 wt %, respectively relative to the total composition.

According to the invention, the composition contains a cross-linking agent, especially water. Hereby more homogeneous and faster full curing of the binder is achieved, compared with a system that cures due to the atmospheric moisture in the environment. Thus the curing of the composition is largely independent of the absolute atmospheric humidity, and the composition cures reliably and rapidly even under extremely dry conditions.

The water content in the composition is preferably between 5 and 40 wt %, more preferably between 10 and 30 wt %, relative to the total composition.

Furthermore, the composition may contain a further cross-linking agent (co-cross-linking agent). Hereby various properties, such as adhesion to the underlying surface and better wetting of the additives as well as improved curing rate of the composition can be selectively optimized and tailored to the situation.

Suitable co-cross-linking agents are selected from among a reactive alkoxysilane or an oligomeric organofunctional alkoxysilane. Preferably the further cross-linking agent is an oligomeric vinyl-functional alkoxysilane, an alkyl-functional alkoxysilane, an epoxy-functional alkoxysilane, a vinyl-functional alkoxysilane, a vinyl-/alkyl-functional alkoxysilane, a mercapto-functional alkoxysilane, a methacryl-functional alkoxysilane or a silicic acid ester.

Examples of suitable co-cross-linking agents are: hexadecyltrimethoxysilane, iso-butyltriethoxysilane/iso-butyltrimethoxysilane, methyltriethoxysilane, methyltrimethoxysilane, octyltrichlorosilane, octyltriethoxysilane, propyltriethoxysilane, propyltrimethoxysilane, 3-glycidyloxypropyltriethoxysilane, 3-glycidyloxypropyltrimethoxysilane, 3-mercaptopropyltrimethoxysilan, 3-methacryloxypropyltrimethoxysilane, methacryloxymethyl-methyldimethoxysilane, methacryloxymethyl-trimethoxysilane, 3-methacryloxypropyltriacetoxysilane, ethyl polysilicate, tetraethyl orthosilicate, tetramethyl orthosilicate, tetra-n-propyl orthosilicate, vinyltrichlorosilane, vinyltriethoxysilane, vinyltrimethoxysilane, vinyltriacetoxysilane, vinyltris(2-methoxyethoxy)silane, N-3-ureidopropyltrimethoxysilane, N-methyl[3-(trimethoxysilyl)propyl] carbamate, N-trimethoxysilylmethyl-O-methylcarbamate, N-dimethoxy(methyl)silyl-methyl-O-methylcarbamate, tris-[3-(trimethoxysilyl)propyl]-isocyanurate or combinations thereof.

If a co-cross-linking agent is used, it may be contained individually or as a mixture of several such agents in a proportion of 10 wt %, preferably of up to 7 wt % and most preferably of up to 5 wt %, relative to the total composition.

According to the invention, the cross-linking agent and if present the co-cross-linking agent is separated from the alkoxysilane-functional polymer to ensure inhibition of reaction prior to use of the composition, in order to prevent curing of the polymer prior to use of the composition.

According to the invention, the composition for formation of a foam contains a blowing-agent mixture. As the blowing-agent mixture, all common chemical blowing agents that are activated by chemical reaction between two ingredients are suitable, i.e. that form a gas as the actual blowing agent. Accordingly, the composition contains a blowing-agent mixture, which comprises compounds that, after being mixed, react with one another with formation of carbon dioxide ($CO_2$), hydrogen ($H_2$) or oxygen ($O_2$).

In one embodiment, the blowing-agent mixture comprises an acid and a compound that is able to react with acids to form carbon dioxide.

Carbonate-containing and hydrogen-carbonate-containing compounds, especially metal or (especially quaternary) ammonium carbonates may be used as compounds that are able to react with acids to form carbon dioxide, such as carbonates of alkali or alkaline earth metals, for example $CaCO_3$, $NaHCO_3$, $Na_2CO_3$, $K_2CO_3$, $(NH_4)_2CO_3$ and the like, wherein chalk ($CaCO_3$) is preferred. In this connection, various types of chalks with different grain sizes and different surface texture can be used, such as, for example, coated or uncoated chalk, or mixtures of two or more of those. Coated chalk types are preferably used, since they react more slowly with the acid and thus ensure controlled foaming or matched foaming and curing time.

Any acid compound capable of reacting with carbonate-containing or hydrogen-carbonate-containing compounds with elimination of carbon dioxide may be used as the acid.

They include inorganic acids, such as phosphoric acid, hydrochloric acid, sulfuric acid; organic mono-, di- or polycarboxylic acids, such as acetic acid, chloroacetic acid, trifluoroacetic acid, fumaric acid, maleic acid, citric acid, ascorbic acid, polyacrylic acid, benzoic acid, toluenesulfonic acid, tartaric acid, glycolic acid, lactic acid or the like, aluminum dihydrogen phosphate, sodium hydrogen sulfate, potassium hydrogen sulfate, aluminum chloride, urea phosphate and other acid-liberating chemicals or mixtures of two or more thereof. The acid generates the gas as the actual blowing agent.

As the acid component, an aqueous solution or an inorganic and/or organic acid may be used. Furthermore, buffered solutions of citric, tartaric, acetic, phosphoric acid and the like may be used.

According to the invention, the content of acid components in the composition may be as high as 15 wt % relative to the total composition, wherein a content is preferably in the range between 2 and 14 wt %, more preferably between 3 and 13 wt % and even more preferably between 4 and 14 wt %.

In an alternative embodiment, the blowing-agent mixture comprises compounds that evolve hydrogen when they react with one another. The following reactions are possible for this purpose:
(i) one or more base metals (e.g. aluminum, iron or zinc) with bases (e.g. one or more alkali metal hydroxides, such as sodium, potassium or lithium hydroxide) or with one or more acids, such as defined above for the carbonates (preferably inorganic acids);
(ii) metal hydrides (e.g. sodium hydride or lithium aluminum hydride) with water, or
(iii) a compound that contains Si-bound hydrogen atoms (e.g. polymethyl hydrogen siloxane, also known as polymethylhydrosiloxane, but also other polyalkyl- or polyaryl hydrogen siloxanes) with proton donors (e.g. water). Among other possibilities, polyhydrogen siloxanes, tetramers, copolymers of dimethylsiloxane and methylhydrosiloxane, trimethylsilyl-terminated polyhydrogen siloxanes, hydride-terminated polydimethylsiloxanes, triethylsilyl-terminated polyethylhydrosiloxanes, hydride-terminated copolymers of polyphenylmethylsiloxane and methylhydrosiloxane and the like are suitable.

These compounds are preferably present in a proportion of 0.1 to 15 wt %, more preferably 3 to 13 wt % and most preferably 4 to 7 wt %, relative to the total composition.

In a further alternative embodiment, the blowing-agent mixture comprises compounds that are able to evolve oxygen when they react, such as, for example, by the reaction of peroxides (e.g. hydrogen peroxide or compounds that release hydrogen peroxide, including solid compounds such as hydrogen peroxide-urea complex and urea phosphate) with metal oxides and/or bases.

These compounds are preferably present in a proportion of 0.1 to 5 wt %, more preferably 1.5 to 4 wt % and most preferably 2 to 3 wt %, relative to the total composition.

According to the invention, the individual ingredients of the blowing-agent mixture are separated from one another to ensure inhibition of reaction prior to use of the composition.

In order to impart greater stability to the foam formed by the blowing-agent mixture, the formed cells must remain stable until curing of the binder, in order to prevent collapse of the polymeric foam structure. Stabilization is all the more necessary the lower the density of the foamed material is to be, i.e. the greater the volume expansion is. Stabilization is usually achieved by means of foam stabilizers.

To the extent necessary, therefore, the inventive composition may further contain a foam stabilizer. Alkylpolyglycosides, for example, are suitable as foam stabilizers. These are available according to methods known in themselves to the person skilled in the art, by reaction of longer-chain monohydric alcohols with mono-, di- or polysaccharides. The longer-chain monohydric alcohols, which optionally may also be branched, preferably have 4 to 22 C atoms, preferably 8 to 18 C atoms and particularly preferably 10 to 12 C atoms in an alkyl moiety. Specifically, 1-butanol, 1-propanol, 1-hexanol, 1-octanol, 2-ethylhexanol, 1-decanol, 1-undecanol, 1-dodecanol (lauryl alcohol), 1-tetradecanol (myristyl alcohol) and 1-octadecanol (stearyl alcohol) may be mentioned as longer-chain monohydric alcohols. Mixtures of the said longer-chain monohydric alcohols may also be used. Further foam stabilizers comprise anionic, cationic, amphoteric and nonionic surfactants known in themselves as well as mixtures thereof. Preferably, alkyl polyglycosides, EO/PO block copolymers, alkyl- or aryl alkoxylates, siloxane alkoxylates, esters of sulfosuccinic acid and/or alkali or alkaline earth metal alkanoate are used. EO/PO block copolymers and polyalkylene glycol ethers are used particularly preferably.

The foam stabilizers may be contained in any one of the components of the inventive composition, as long as they do not react with one another.

According to the invention, the composition contains an insulating-layer-forming additive, wherein the additive may comprise both an individual compound and also a mixture of several compounds.

Expediently, the compounds used as insulating-layer-forming additives are such that, due to the formation of an expanded, insulating layer of flame-retardant material formed under the effect of heat, they protect the substrate from overheating and thereby prevent or at least delay the change of the mechanical and static properties of load-bearing building parts under the effect of heat. The formation of a voluminous insulating layer, namely an ash layer, may take place due to the chemical reaction of a mixture of compounds that are appropriately matched to one another and that react with one another under the effect of heat. Such systems are known to the person skilled in the art as chemical intumescence, and they may be used according to the invention. Alternatively, the voluminous, insulating layer may be formed by physical intumescence. According to the invention, the two systems may be used respectively alone or together as a combination.

In general, at least three components are required for the formation of an intumescent layer by chemical intumescence: a carbon source, a dehydrogenation catalyst and a gas builder, which in many cases are contained in a binder. Under the effect of heat, the binder softens and the fire-protection additives are released, so that they are able react with one another in the case of chemical intumescence or to expand in the case of physical intumescence. From the dehydrogenation catalyst, the acid that functions as catalyst for the carbonization of the carbon source is formed by thermal decomposition. At the same time, the gas builder decomposes thermally with formation of inert gases, which bring about expansion of the carbonized material, as does optionally the softened binder, with formation of a voluminous, insulating foam.

In one embodiment of the invention, in which the insulating layer is formed by chemical intumescence, the insulating-layer-forming additive comprises at least one carbon-skeleton-forming substance, if the binder cannot be used as such, at least one acid former, at least one gas builder and at least one inorganic skeleton-forming substance. The components of the additive are selected in particular such that they are able to develop synergy, wherein some of the compounds are able to perform several functions.

As carbon source, the compounds usually used in intumescent flame-protection agents and known to the person skilled in the art can be considered, such as starch-like compounds, e.g. starch and modified starch, and/or polyhydric alcohols (polyols), such as saccharides and polysaccharides and/or a thermoplastic or thermosetting polymeric resin binder, such as a phenol resin, a urea resin, a polyurethane, polyvinyl chloride, poly(meth)acrylate, polyvinyl acetate, polyvinyl alcohol, a silicone resin and/or a rubber. Suitable polyols are polyols from the group comprising sugar, pentaerythritol, dipentaerythritol, tripentaerythritol, alkoxylated pentaerythritol, polyvinyl acetate, polyvinyl alcohol, sorbitol, EO-PO-polyols. Pentaerythritol, dipentaerythritol or polyvinyl acetate are preferably used.

It must be mentioned that the polymer that acts as binder may itself also have the function of a carbon source in the fire situation, so that the inclusion of an additional carbon source is not always necessary.

The compounds commonly used in intumescent fire-protection formulations and known to the person skilled in the art, such as a salt or an ester of an inorganic, nonvolatile acid selected from among sulfuric acid, phosphoric acid or boric acid, may be considered as the dehydrogenation catalysts or acid formers. Mainly phosphorus-containing compounds, the range of which is very broad, are used, since they extend over several oxidation states of phosphorus, such as phosphines, phosphine oxides, phosphonium compounds, phosphates, elemental red phosphorus, phosphites and phosphates. As examples of phosphoric acid compounds, the following can be mentioned: monoammonium phosphate, diammonium phosphate, ammonium phosphate, ammonium polyphosphate, melamine phosphate, melamine resin phosphates, potassium phosphate, polyol phosphates such as, for example, pentaerythritol phosphate, glycerol phosphate, sorbitol phosphate, mannitol phosphate, dulcitol phosphate, neopentyl glycol phosphate, ethylene glycol phosphate, dipentaerythritol phosphate and the like. Preferably a polyphosphate or an ammonium polyphosphate is used as the phosphoric acid compound. In this connection, compounds such as reaction products of lamelite C (melamine-formaldehyde resin) with phosphoric acid can be understood as melamine resin phosphates. As examples of sulfuric acid compounds, the following may be mentioned: ammonium sulfate, ammonium sulfamate, nitroaniline bisulfate, 4-nitroaniline-2-sulfonic acid 4,4-dinitrosulfanilamide and the like. As an example of boric acid compounds, melamine borate may be mentioned.

As gas builders, the compounds commonly used in flame-protection agents and known to the person skilled in the art may be considered, such as cyanuric acid or isocyanuric acid and derivatives thereof, melamine and derivatives thereof. These include cyanamide, dicyanamide, dicyandiamide, guanidine and its salts, biguanide, melamine cyanurate, cyanic acid salts, cyanic acid esters and amides, hexamethoxymethyl melamine, dimelamine pyrophosphate, melamine polyphosphate, melamine phosphate. Preferably, hexamethoxymethyl melamine or melamine (cyanuric acid amide) are used.

Furthermore, components that do not restrict their mode of action to a single function are suitable, such as melamine polyphosphate, which acts both as an acid former and as a gas builder. Further examples are described in GB 2 007 689 A1, EP 139 401 A1 and U.S. Pat. No. 3,969,291 A1.

In one embodiment of the invention, in which the insulating layer is formed by physical intumescence, the insulating-layer-forming additive comprises at least one thermally expandable compound, such as a graphite intercalation compound, which compounds are also known as expandable graphite. These may likewise be contained in the binder, especially homogeneously.

Intercalation compounds of $SO_x$, $NO_x$, halogen and/or strong acids in graphite can be considered as examples of expandable graphite. These are also referred to as graphite salts. Expandable graphites that evolve $SO_2$, $SO_3$, NO and/or $NO_2$ while expanding at temperatures of 120 to 350° C., for example, are preferred. As an example, the expandable graphite may be available in the form of lamellas with a maximum diameter in the range of 0.1 to 5 mm. Preferably this diameter lies in the range of 0.5 to 3 mm. Expandable graphite suitable for the present invention are commercially available. In general, the expandable-graphite particles are uniformly distributed in the inventive fire-protection elements. However, the concentration of expandable-graphite particles may also be varied in the manner of spots, patterns, areas or sandwiches. In this respect, reference is made to EP 1489136 A1, the contents of which are incorporated herewith in the present Application.

In a further embodiment of the invention, the insulating layer is formed both by chemical and by physical intumescence, so that the insulating-layer-forming additive comprises both a carbon source, a dehydrogenation catalyst and a gas builder as well as thermally expandable compounds.

In addition, the insulating-layer-forming fire-protection additive contributes to increasing the density of the foams, since hereby the fire-protection properties can be improved. The foams generally have densities of approximately 140-300 g/cm$^3$, measured in accordance with DIN EN ISO 845 (measured in standard climate of 23±2° C. and 50±10% relative humidity).

The insulating-layer-forming additive may be contained in a proportion of 10 to 70 wt % in the composition. In order to achieve the highest possible intumescence rate, the proportion of the insulating-layer-forming additive in the total formulation is adjusted to the highest possible level, but care must be taken that the viscosity of the composition is not too high, so that the composition can still be processed readily. The proportion is preferably 12 to 60 wt %, and particularly preferably 15 to 30 wt %, relative to the total composition.

According to the invention, the composition contains at least one water-soluble flame-protection agent.

The inventors have found that the use of flame-protection agents that are water-soluble or miscible with water as well as of compounds that are water-soluble or miscible with water greatly improves the mixing of all ingredients of the composition and thus significantly accelerates curing. Thus subsidence or collapse of the formed foam is prevented. Thus the use of a catalyst is also completely unnecessary. Furthermore, the storage stability of the composition is increased hereby and the use of metal compounds that are hazardous to health, such as organotin compounds, for example, may be avoided.

Suitable flame-protection agents are preferably phosphorus-containing and especially halogen-free. Phosphates or phosphonates, such as, for example, diethylethane phosphonate (DEEP), triethyl phosphate (TEP) and dimethylpropyl phosphonate (DMPP), dimethylmethane phosphonate (DMMP), tris-(2-chloroethyl) phosphate (TCEP) as well as commercial water-soluble halogen-containing flame-protection polyols, may be used as water-soluble flame-protection agents. Of those, diethylethyl phosphonate (DEEP), triethyl phosphate (TEP) and dimethylpropyl phosphonate (DMPP) as well as mixtures thereof are preferred.

In general, the proportion of the flame-protection agent or of the mixture of flame-protection agents amounts to 4 to 30 wt %, preferably 9 to 25 wt % and more preferably 14 to 20 wt % relative to the polymer-containing component. For example, in a 3:1 mixture (3 parts polymer-containing component and 1 part curing-agent component), this corresponds to 5 to 25 wt %, preferably 7 to 20 wt %, more preferably 10 to 15 wt % relative to the total mass of all components.

The water-soluble flame-protection agent may have several functions, and so, by virtue of the flame-protection agent, choices may also be made with respect to its further effects to be achieved. For example, triethyl phosphate improves the intermixing of the composition, but besides its main property as a flame-protection agent it also acts as a plasticizer.

Instead of the water-soluble flame-protection agent or in addition, it is possible, according to the invention, to use a liquid compound that is likewise soluble in water or miscible with water. Such compounds are in particular acetone, sulfolane, ethanol, methanol and mixtures thereof.

The liquid compound may be used in the same quantities as the flame-protection agent or mixture of flame-protection agents, wherein, in the case of use of a liquid compound in addition to the flame-protection agent or mixture of flame-protection agents, the already mentioned proportions correspond to the sum of the total mixture of the liquid compound and of the flame-protection agent or mixture of flame-protection agents.

Since the ash crust formed due to the insulating-layer-forming fire-protection additive in the fire situation is usually too unstable and, depending on its density and structure, it can be blasted by air streams, for example, which negatively influences the insulating effect of the coating, at least one ash-crust stabilizer is preferably added to the compounds just listed. In this connection, the mode of action is in principle that the inherently soft carbon layers being formed are mechanically strengthened by inorganic compounds. The addition of such an ash-crust stabilizer contributes to substantial stabilization of the intumescent crust in the fire situation, since these additives increase the mechanical strength of the intumescent layer and/or prevent it from dripping.

The compounds commonly used in fire-protection formulations and known to the person skilled in the art, for example expandable graphite and particulate metals, such as aluminum, magnesium, iron and zinc, may be considered as ash-crust stabilizers or skeleton-forming substances. The particulate metal may exist in the form of a powder, lamellas, flakes, fibers, filaments and/or whiskers, wherein the particulate metal in the form of powder, lamellas or flakes preferably has a particle size of ≤50 μm, preferably of 0.5 to 10 μm. In the case that the particulate metal is used in the form of fibers, filaments and/or whiskers, a thickness of 0.5 to 10 μm and a length of 10 to 50 μm are preferred. Alternatively or additionally, an oxide or a compound of a metal from the group comprising aluminum, magnesium, iron or zinc may be used as the ash-crust stabilizer, especially iron oxide, preferably ferric oxide, titanium dioxide, a borate, such as zinc borate and/or a glass frit of low-melting glasses with a melting temperature of preferably 400° C. or above, phosphate or sulfate glasses, melamine poly(zinc sulfates), ferroglasses or calcium borosilicates. The addition of such an ash-crust stabilizer contributes to substantial stabilization of the ash crust in the fire situation, since these additives increase the mechanical strength of the intumescent layer and/or prevent it from dripping. Examples of such additives can also be found in U.S. Pat. Nos. 4,442,157 A, 3,562,197 A, GB 755 551 A and EP 138 546 A1.

In addition, ash-crust stabilizers such as melamine phosphate or melamine borate may be present.

In one embodiment, the inventive composition further contains at least one further ingredient, selected from among plasticizers, cross-linking agents, water scavengers, organic and/or inorganic aggregates and/or further additives.

The plasticizer has the purpose of making the polymer network soft. Furthermore, the plasticizer has the purpose of introducing an additional liquid component, so that the fillers are completely wetted and the viscosity is adjusted to the point that the coating becomes processable. The plasticizer may be contained in such a proportion in the composition that it is adequately able to fulfill the functions just described.

Suitable plasticizers are selected from among derivatives of benzoic acid, phthalic acid, e.g. phthalates such as dibutyl-, dioctyl-, dicyclohexyl-, diisooctyl-, diisodecyl-, dibenzyl- or butylbenzyl phthalate, trimellitic acid, pyromellitic acid, adipic acid, sebacic acid, fumaric acid, maleic acid, itaconic acid, caprylic acid and citric acid, alkyl phosphate esters and derivatives of polyesters and polyethers, epoxidized oils, $C_{10}$-$C_{21}$ alkylsulfonic acid esters of phenol and alkyl esters. Preferably, the plasticizer is an ester derivative of terephthalic acid, a triol ester of caprylic acid, a glycol diester, diol esters of aliphatic dicarboxylic acids, ester derivatives of citric acid, secondary alkylsulfonic acid esters, ester derivatives of glycerol with epoxy groups and ester derivatives of the phosphates. More preferably, the plasticizer is bis(2-ethylhexyl) terephthalate, trihydroxymethylpropylcaprylate, triethylene glycol-bis(2-ethylhexanoate), 1,2-cyclohexanedicarboxylic acid diisononyl ester, a mixture of 75-85% secondary alkylsulfonic acid esters, 15-25% secondary alkanedisulfonic acid diphenyl esters as well as 2-3% non-sulfonated alkanes, triethyl citrate, epoxidized soya bean oil, tri-2-ethylhexyl phosphate or a mixture of n-octyl- and n-decyl succinate.

Within the composition, the plasticizer may be present preferably in a proportion of up to 40 wt %, more preferably up to 35 wt % and even more preferably up to 15 wt %, relative to the total composition.

In order to prevent a premature reaction of the alkoxysilane-functional polymer with residual moisture of ingredients that may be present in the composition, especially fillers and/or additives, or with the atmospheric moisture, usually water scavengers are added to the composition. Thereby the moisture introduced into the formulations is scavenged. Preferably, the water scavenger is an organofunctional alkoxysilane or an oligomeric organofunctional alkoxysilane, more preferably a vinyl-functional alkoxysilane, an oligomeric vinyl-functional alkoxysilane, a vinyl-/alkyl-functional alkoxysilane, an oligomeric alkyl-functional alkoxysilane, an acetoxy-/alkyl-functional alkoxysilane, a carbamatosilane, an arylalkoxysilane or a methacryloxy-functional alkoxysilane. Most preferably, the water scavenger is di-tert-butoxydiacetoxysilane, vinyltriethoxysilane, vinyltrimethoxysilane, vinyltris(2-methoxyethoxy)silane, vinyldimethoxymethylsilane, vinyltriacetoxysilane, 3-methacryloxypropyltrimethoxysilane, methacryloxymethylmethyldimethoxysilane, methacryloxymethyltrimethoxysilane, 3-methacryloxypropyltriacetoxysilane, N-methyl[3-(trimethoxysilyl)propyl]carbamate, N-trimethoxysilylmethyl-O-methylcarbamate, N-dimethoxy (methyl)silyl-methyl-O-methylcarbamate, phenyltrimethoxysilane or combinations thereof.

The added proportion of water scavenger is guided by the water content of the ingredients of the formulation, except for the specially added water (ingredient B), and it usually lies in the range up to 4 wt %. The water scavenger may be present in a proportion of 0.1 to 4 wt %, preferably 0.8 to 3 wt % and more preferably 0.8 to 2.5 wt %, relative to the total composition.

Besides the already described additives, the composition may optionally contain common auxiliary agents, such as wetting agents, for example on the basis of polyacrylates and/or polyphosphates, dyes, fungicides, or diverse fillers, such as vermiculite, inorganic fibers, silica sand, glass microbeads, mica, silicon dioxide, mineral wool and the like.

Further additives such as thickeners and/or rheology additives and fillers may be included in the composition. Preferably polyhydroxycarboxylic acid amides, urea derivatives, salts of unsaturated carboxylic acid esters, alkylammonium salts of acid phosphoric acid derivatives, ketoximes, amine salts of p-toluenesulfonic acid, amine salts of sulfonic acid derivatives as well as aqueous or organic solutions or mixtures of the compounds are used as rheology additives, such as anti-settling agents, anti-sagging agents and thixotropic agents. Rheology additives on the basis of fumed or precipitated silicas or on the basis of silanized fumed or precipitated silicas may be used. Preferably the rheology additive is fumed silicas, modified and non-modified layer silicates, precipitated silicas, cellulose ethers, polysaccharides, PU and acrylate thickeners, urea derivatives, castor oil derivatives, polyamides and fatty acid amides and polyolefins, provided they exist in solid form, pulverized celluloses and/or suspension agents, such as xanthan gum, for example.

The inventive composition may be packaged as a two-component or multi-component system, wherein the term multi-component system also includes two-component systems. The composition is preferably packaged as a two-component system, in which the individual ingredients of the blowing-agent mixture are separated from one another to ensure inhibition of reaction prior to use of the composition, and the cross-linking agent is separated from the alkoxysilane-functional polymer to ensure inhibition of reaction prior to use of the composition. Depending on their compatibility with one another and with the compounds contained in the composition, the further ingredients of the composition are divided and may be contained in one of the two components or in both components. Furthermore, the division of the further ingredients, especially of the solid ingredients, may depend on the proportions in which they are to be contained in the composition. By appropriate division, it is optionally possible to achieve a higher proportion relative to the total composition. The fire-protection additive may then be contained as the total mixture or divided into individual components in one component or several components. The components are divided in a way that depends on the compatibility of the compounds contained in the composition, so that neither a reaction with one another or mutual interference of the compounds contained in the composition nor a reaction of these compounds with the compounds of the other ingredients can take place. This depends on the compounds being used.

Further subject matter of the invention is the use of an inventive composition for foaming of openings, cable and pipe penetrations in walls, floors and/or ceilings, of joints between ceilings and wall parts, between masonry openings and construction parts to be installed, such as window and door frames, between ceilings and walls and between outside walls and curtain-wall facades of buildings for the purpose of fire protection.

Further subject matter of the invention is a method in which the components of a foam system described in the foregoing are mixed with one another at or close to the point of use and the mixture is introduced or applied at the desired place, for example in a gap, in a cavity or on a surface. This is the case of so-called foam-in-place foams.

Further subject matter of the invention are molded blocks, which can be obtained by the method just described, wherein the foam may be manufactured in a mold, for example. In this context it is conceivable to use a composition according to the invention to manufacture molded blocks that will be inserted in masonry openings, e.g. cable bulkheads. Other preferred uses include the bulkheading of cables, pipes, busbars and/or joints. They may also be used preferably as seals for fire protection and for manufacture of fire-protection adhesive compounds, for coating of surfaces and for manufacture of sandwich building parts or composite panels.

The molded blocks foam up in the fire situation and consequently flame propagation is prevented, thus making them suitable as sealing elements, safety devices, fire barriers or claddings. They may therefore be used as grouting and as seals for cable penetrations as well as for sealing of masonry openings. The use of a fire-protection element as the inner coating of fire-retardant doors, which foams up in the fire situation and has an insulating effect, may also be considered, as may the manufacture of door seals and other seals that foam up in the fire situation and seal the slit in front of them.

The invention will be explained in more detail hereinafter on the basis of some examples.

EXEMPLARY EMBODIMENTS

The individual ingredients listed in Tables 2, 3 and 4 are respectively mixed and homogenized. For use, these mixtures are mechanically mixed with one another in a container until homogeneous intermixing has been achieved and until foaming has begun.

TABLE 1

| | Substances used |
|---|---|
| Silane-terminated prepolymer I | Silane-terminated polyurethane, Desmoseal S XP-2821 of Bayer AG; viscosity at 23° C. ~20000 mPa · s |
| Silane-terminated prepolymer II | Silane-terminated polyurethane, Desmoseal S XP-2749 of Bayer AG, viscosity at 23° C. ~4500 mPa · s |
| Silane-terminated prepolymer III | Dimethoxy(methyl)silyl methylcarbamate-terminated polyether Geniosil STP-E 10 of Wacker, viscosity, dynamic at 25° C. ~10000 mPa · s (DIN 51562); density at 20° C. 1.0069 g/cm³ |

TABLE 1-continued

| Substances used | |
|---|---|
| Silane-terminated prepolymer IV | KANEKA MS POLYMER SAX015 of Kaneka Beldium NV |
| Triethyl phosphate (TEP) | Levagard ® TEP-Z of Lanxess; viscosity at 20° C.: <1.7 mPa · s |
| Dimethylpropane phosphonate (DMPP) | Levagard ® DMPP of Lanxess; viscosity 2.16 mPa · s |
| Tri(2-chloroisopropyl) phosphate (TCPP) | Levagard ® PP; viscosity 85 mPa · s |
| Acetone | Merck |
| Sulfolane | of Sigma-Aldrich, product number T22209 |
| Vinyltrimethoxysilane | Geniosil ® XL 10 of Wacker, viscosity, dynamic at 25° C. 0.6 mPa · s; density at 25° C. 0.97 g/cm$^3$ |
| Demineralized water | |
| Calcium carbonate | OMYABOND 520-OM of Omya |
| Citric acid, anhydrous | Citric acid, anhydrous F6000 (CAS no. 77-92-9) of BCD Chemie |
| L-Tartaric acid | Natural L(+)-tartaric acid of BCD Chemie; type 2 2-400 mic. 25/SAC |
| Expandable graphite | Nord-Min ® 351 of Nordmann-Rassmann, Hamburg, Germany; |
| Ammonium polyphosphate (APP) | Exolit ® AP 462 of Clairant; microencapsulated with melamine resin |
| Dipentaerythritol | Charmor ® DP 40 of Perstorp . . . ; particle size < 40 μm; moisture content 0.1%; at least 98% |
| | Holtac D of Perstorp; particle size < 40 μm; at least 99% |
| Iron oxide (Fe$_2$O$_3$) | Bayferrox 130 M of Lanxess |
| Xanthan | Xanthan of Kremer Pigmente, article number 63450 |
| Fumed silica | Cab-O-Sil TS-720 of Cabot |
| Catalyst TIB KAT 223 | Dioctyltin acetylacetonate of TIB Chemicals AG |

Assessment of the Foam Resistance

The foam resistance or the foam collapse was visually assessed, wherein the assessment was made at the point in time at which the foam had reached its maximum height. It was observed whether the foam had lost its maximum height or had subsided.

Determination of the Tack-Free Time as a Parameter for the Foam Curing Time

After completion of discharge, the tackiness of the foam surface was tested with a wooden spatula at specified time intervals. For this purpose, the wooden spatula was laid lightly on the foam surface and lifted once again. The point in time at which filaments were no longer being drawn or at which it was no longer possible to observe any material detachment at the foam surface defines the tack-free time.

Measurement of the Viscosity

The dynamic viscosity was measured with a Kinexus Ultra+ instrument of Malvern Instruments Ltd. at 23° C., with 2 mm slit and a plate with 20 mm diameter. The value in mPa·s was read at a rotational speed of 100 per second.

TABLE 2

Foam curing time (tack-free time) and foam stability in dependence on the flame-protection agent used and its quantity (values in wt %)

| | Comparison 1 | Comparison 2 | Comparison 3 | Comparison 4 | Comparison 5 | Example 1 | Example 2 | Example 3 | Example 4 |
|---|---|---|---|---|---|---|---|---|---|
| Silane-terminated prepolymer I | 25.4 | 22.2 | 18.6 | 25.4 | 25.4 | 22.2 | 18.6 | 22.2 | 18.6 |
| Silane-terminated prepolymer IV | 18.1 | 15.9 | 13.2 | 18.1 | 18.1 | 15.9 | 13.4 | 15.9 | 13.2 |
| TEP | — | — | — | 3.6 | — | 9.0 | 15.2 | — | — |
| DMPP | — | — | — | — | 3.6 | — | — | 9.0 | 15.2 |
| TCPP | 3.6 | 9.0 | 15.2 | — | — | — | — | — | — |
| Vinlytrimethoxysilane | 2.1 | 2.1 | 2.1 | 2.1 | 2.1 | 2.1 | 2.1 | 2.1 | 2.1 |
| Demineralized water | 11.1 | 11.1 | 11.1 | 11.1 | 11.1 | 11.1 | 11.1 | 11.1 | 11.1 |
| Calcium carbonate | 6.2 | 6.2 | 6.2 | 6.2 | 6.2 | 6.2 | 6.2 | 6.2 | 6.2 |
| Citric acid, anhydrous | 5.4 | 5.4 | 5.4 | 5.4 | 5.4 | 5.4 | 5.4 | 5.4 | 5.4 |
| Expandable graphite | 12.1 | 12.1 | 12.1 | 12.1 | 12.1 | 12.1 | 12.1 | 12.1 | 12.1 |
| APP | 5.8 | 5.8 | 5.8 | 5.8 | 5.8 | 5.8 | 5.8 | 5.8 | 5.8 |
| Monopentaerythritol | 2.9 | 2.9 | 2.9 | 2.9 | 2.9 | 2.9 | 2.9 | 2.9 | 2.9 |
| Iron oxide (Fe$_2$O$_3$) | 0.8 | 0.8 | 0.8 | 0.8 | 0.8 | 0.8 | 0.8 | 0.8 | 0.8 |
| L-Tartaric acid | 5.4 | 5.4 | 5.4 | 5.4 | 5.4 | 5.4 | 5.4 | 5.4 | 5.4 |
| Xanthan | 0.2 | 0.2 | 0.2 | 0.2 | 0.2 | 0.2 | 0.2 | 0.2 | 0.2 |
| Fumed silica | 0.7 | 0.7 | 0.7 | 0.7 | 0.7 | 0.7 | 0.7 | 0.7 | 0.7 |
| Foam curing time [min] | 3.33 | 4 | 5 | 4 | 2 | 2.33 | 1.67 | 1.33 | 0.55 |
| Foam stability* | − | − | − | − | − | + | + | + | + |

"−" = foam collapse/"+" = foam remains stable

TABLE 3

Foam curing time and foam stability in dependence on the solvent used and its quantity (values in wt %)

|  | Comparison 6 | Example 5 | Example 6 | Comparison 7 | Example 8 | Example 9 |
|---|---|---|---|---|---|---|
| Silane-terminated prepolymer I | 25.7 | 22.5 | 18.9 | 25.7 | 22.5 | 18.9 |
| Silane-terminated prepolymer IV | 18.4 | 16.1 | 13.4 | 18.7 | 16.1 | 13.5 |
| Acetone | 3.7 | 9.1 | 15.4 | — | — | — |
| Sulfolane | — | — | — | 3.7 | 9.1 | 15.4 |
| Vinlytrimethoxysilane | 2.2 | 2.1 | 2.1 | 2.1 | 2.1 | 2.1 |
| Demineralized water | 11.1 | 11.1 | 11.1 | 11.1 | 11.1 | 11.1 |
| Calcium carbonate | 6.3 | 6.2 | 6.2 | 6.2 | 6.2 | 6.2 |
| Citric acid, anhydrous | 5.4 | 5.4 | 5.4 | 5.4 | 5.4 | 5.4 |
| Expandable graphite | 12.7 | 12.1 | 12.1 | 12.1 | 12.1 | 12.1 |
| APP | 6.1 | 5.8 | 5.8 | 5.8 | 5.8 | 5.8 |
| Dipentaerythritol | 2.9 | 2.9 | 2.9 | 2.9 | 2.9 | 2.9 |
| L-Tartaric acid | 5.4 | 5.4 | 5.4 | 5.4 | 5.4 | 5.4 |
| Xanthan | 0.2 | 0.2 | 0.2 | 0.2 | 0.2 | 0.2 |
| Foam curing time [min] | 2.6 | 2.4 | 1.7 | 2.5 | 2.0 | 1.9 |
| Foam resistance | − | + | + | − | + | + |

TABLE 4

Influence of the catalyst on the storage stability (shelf life) of the polymer component, determined on the basis of the viscosity of the composition

|  | Example 10 | Comparison 8 | Example 11 | Comparison 9 | Example 12 | Comparison 10 | Example 13 | Comparison 11 |
|---|---|---|---|---|---|---|---|---|
| Silane-terminated prepolymer I |  |  | 52.5 | 52.5 | 26.25 | 26.25 |  |  |
| Silane-terminated prepolymer II | 52.5 | 52.5 |  |  |  |  |  |  |
| Silane-terminated prepolymer III |  |  |  |  |  |  | 52.5 | 52.5 |
| Silane-terminated prepolymer IV |  |  |  |  | 26.25 | 26.25 |  |  |
| TEP | 12 | 12 | 12 | 12 | 12 | 12 | 12 | 12 |
| Vinlytrimethoxysilane | 2.25 | 2.25 | 2.25 | 2.25 | 2.25 | 2.25 | 2.25 | 2.25 |
| Calcium carbonate | 8.25 | 8.25 | 8.25 | 8.25 | 8.25 | 8.25 | 8.25 | 8.25 |
| Expandable graphite | 16.67 | 16.67 | 16.67 | 16.67 | 16.67 | 16.67 | 16.67 | 16.67 |
| APP | 8.33 | 8.33 | 8.33 | 8.33 | 8.33 | 8.33 | 8.33 | 8.33 |
| Catalyst |  | additionally 0.7% |  | additionally 0.7% |  | additionally 0.7% |  | additionally 0.7% |
| Shear viscosity at 23° C. 100 rev. per sec. [Pa · s], freshly prepared | 2.825 | 5.376 | 5.692 | 7.472 | 1.686 | 1.786 | 4.461 | 6.972 |
| Shear viscosity at 23° C., 100 rev. per sec. [Pa · s], storage: 1 week at 40° C. | 3.567 | 100 | 8.114 | 13.23 | 2.194 | 4.767 | 5.008 | 84.07 |
| Shear viscosity at 23° C., 100 rev. per sec. [Pa · s], storage: 4 weeks at 40° C. | 4.842 | not measurable | 9.771 | 49 | 2.439 | 50.49 | 7.683 | not measurable |

The results of Comparison Examples 1 to 3 (Table 2) show that a composition that contains a non-water-soluble flame-protection agent in the form of TCPP indeed foams up, but the foam collapses before it cures.

The results of Comparison Examples 4 to 7 (Tables 2 and 3) show that a composition that contains a water-soluble flame-protection agent in the form of TEP or DMPP and that contains a water-soluble liquid in the form of acetone or sulfolane in a concentration of 3.6 wt % foams up, but the foam collapses before it cures.

When the concentration of liquid flame-protection agent (TEP, DMPP) or of liquid compounds (acetone, sulfolane) that are water-soluble is increased, the curing time of the foams becomes shorter and the foam remains preserved. This is shown by Examples 1 to 9.

The formulations produced according to Table 4, which in a two-component system correspond to the polymer component, were stored at 40° C. The viscosity both of the freshly prepared formulations and also of the respective formulation after a storage time of one week or four weeks were measured according to the foregoing method.

From Table 4 it is evident that, in the formulations that contain a catalyst (Comparison Examples 8 to 11), a distinct increase of the viscosity can already be recognized after one week of storage, or at least after four weeks of storage. As a result, the component that contains the prepolymer in formulations using cartridges, for example, such as two-component cartridges, becomes highly viscous, which leads to very high squeezing forces, to mixing disorders and consequently to inadequate foaming.

Compared with the catalyst-containing formulations, the catalyst-free formulations (Examples 10 to 13) exhibit hardly any increase in viscosity.

From this, it can be concluded that the catalyst-free formulations have a distinctly increased and thus improved storage stability.

The invention claimed is:

1. A foamable, insulating-layer-forming multi-component composition, comprising:
   at least one alkoxysilane-functional polymer, which contains, as terminal groups and/or as side groups along the polymer chain, at least two alkoxy-functional silane groups of formula (I):

   $$—Si(R^1)_m(OR^2)_{3-m} \qquad (I),$$

wherein $R^1$ stands for a linear or branched $C_1$-$C_{16}$ alkyl moiety, $R^2$ stands for a linear or branched $C_1$-$C_6$ alkyl moiety, and m stands for a whole number from 0 to 2,
   at least one cross-linking agent, which, prior to use of the composition, is separated from the alkoxysilane-functional polymer to ensure inhibition of reaction,
   a blowing-agent mixture, the individual ingredients of which, prior to use of the composition, are separated from one another to ensure inhibition of reaction,
   at least one insulating-layer-forming fire-protection additive, and
   7 to 20 wt %, relative to the total weight of the composition, of at least one compound selected from the group consisting of liquid flame-protection agents and liquid compounds that are respectively water-soluble or miscible with water,
   wherein the liquid flame-protection agent is at least one member selected from the group consisting of diethylethane phosphonate, triethylphosphate, dimethylpropyl phosphonate, and dimethylmethane phosphonate, and
   wherein the liquid compound is at least one member selected from the group consisting of acetone, sulfolane, ethanol, methanol, and mixtures thereof,
   wherein the polymer has a dynamic viscosity in the range of 5 to 27 Pa·s, measured with a Kinexus Ultra+ from Malvern Instruments Ltd.; at a temperature of 23° C.; with a spindle type: plate with a diameter of 20 mm with a 2 mm slit; at a rotational speed of 100 s$^{-1}$, and wherein the polymer comprises a basic backbone, which is at least one member selected from the group consisting of an alkyl chain, a polyether, polyester, polyether ester, polyamide, polyurethane, polyester urethane, polyether urethane, polyether ester urethane, polyamide urethane, polyurea, polyamine, polycarbonate, polyvinyl ester, polyacrylate, polyolefin, polyisobutylene, polysulfide, rubber, neoprene, phenol resin, epoxy resin and melamine, with the proviso that the composition does not contain any organotin catalyst.

2. The composition according to claim 1, comprising the at least one liquid flame-protection agent.

3. The composition according to claim 1, comprising the at least one liquid compound.

4. The composition according to claim 1, wherein the blowing-agent mixture comprises compounds that, after being mixed, react with one another with formation of carbon dioxide ($CO_2$), of hydrogen ($H_2$) or of oxygen ($O_2$).

5. The composition according to claim 4, wherein the blowing-agent mixture comprises an acid and a compound, that is able to react with the acid to form carbon dioxide.

6. The composition according to claim 1, wherein the alkoxysilane-functional polymer is a mixture of two or more alkoxy functional polymers.

7. The composition according to claim 1, wherein the basic backbone is a polyurethane and/or a polyether.

8. The composition according to claim 1, wherein the cross-linking agent is water or a water-containing ingredient.

9. The composition according to claim 1, wherein the insulating-layer-forming fire-protection additive comprises at least one thermally expandable compound and/or a mixture that contains at least one acid former, at least one gas builder and optionally at least one carbon source.

10. The composition according to claim 9, wherein the fire-protection additive further contains an ash-crust stabilizer.

11. The composition according to claim 1, wherein the composition contains a co-cross-linking agent.

12. The composition according to claim 1 further comprising at least one further ingredient which is selected from the group consisting of plasticizers, water scavengers, inorganic fillers and further additives.

13. A molded block, obtained from a composition according to claim 1, wherein the respective components are mixed with one another and the mixture is foamed in a mold.

14. A method comprising:
   mixing components of the composition according to claim 1 with one another, thereby obtaining a mixture, and
   foaming the mixture in a mold.

15. A method comprising:
   applying the composition according to claim 1, as a mixture, to at least one cavity or surface selected from the group consisting of openings; cable or pipe penetrations in walls, floors and/or ceilings; joints between a ceiling and a wall part; joints between a masonry opening and a construction part to be installed; joints between a ceiling and a wall; and joints between an outside wall and a curtain-wall facade of a building, to thereby provide fire protection to the cavity or surface.

16. The composition according to claim 1, containing no metal catalyst.

17. The composition according to claim 1, containing no catalyst.

18. The composition according to claim 1, comprising 9 to 20 wt % relative to the total weight of the composition, of the at least one compound selected from the group consisting of liquid flame-protection agents and liquid compounds that are respectively water-soluble or miscible with water.

19. The composition according to claim 1, comprising 9 to 15.4 wt %, relative to the total weight of the composition, of the at least one compound selected from the group consisting of liquid flame-protection agents and liquid compounds that are respectively water-soluble or miscible with water, and wherein the at least one compound comprises triethylphosphate, dimethylpropyl phosphonate, acetone, or sulfolane.

20. The composition according to claim 1, wherein the foamable composition gives a stable foam when foamed.

* * * * *